Dec. 9, 1930.   D. P. MOORE   1,784,376
PAPER MULCH AND REENFORCING AND RETAINING MEANS THEREFOR
Filed May 22, 1928
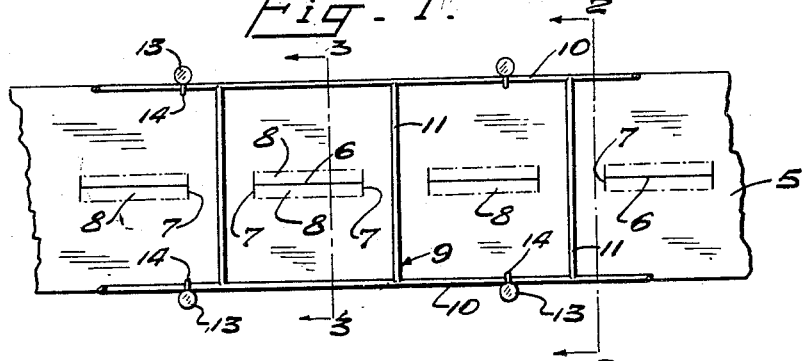
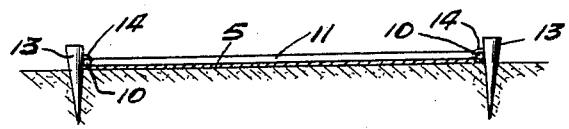
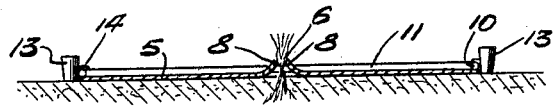
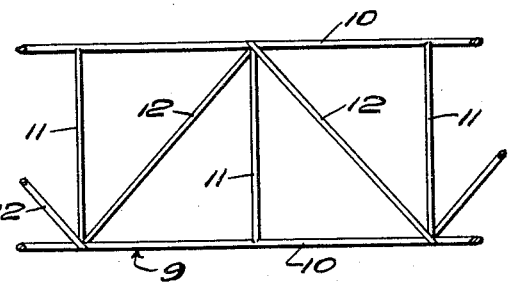
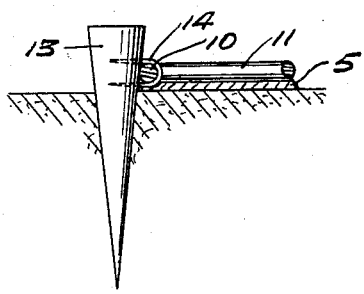
Inventor
David Peltho Moore Patented Dec. 9, 1930

1,784,376

UNITED STATES PATENT OFFICE

DAVID PELTON MOORE, OF AVON PARK, FLORIDA

PAPER MULCH AND REENFORCING AND RETAINING MEANS THEREFOR

Application filed May 22, 1928. Serial No. 279,701.

In putting into use, the various paper mulches of the prior art, no provision was made and set forth for properly assisting in laying, and after laying, of the paper upon the prepared ground, for retaining the paper flat and to hold it so that wind will not cause it to be moved and in many cases rolled and torn. Pegs and paper disks have been proposed, but this fails of its purpose as the marginal edges of the paper are not protected and gusts of wind getting under the margins between the pegs cause the paper to be torn transversely and sometimes longitudinally as well, and thus defect the very purpose of the pegs and disks.

It is therefore the object of this invention to provide in combination with the roll of paper a cheap metal lattice or network of very light wire than can be rolled with the paper in the initial rolls but which is not embedded in the paper, and which when the paper is unrolled upon the ground will be upon the upper surface of the paper and provide means for holding the paper flat and taut both longitudinally and transversely, as the lattice or network can be stapled to pins or short posts driven into the ground at intervals and adjacent the margins of the paper.

By this means the great objection to the use of paper mulch is overcome, and even should small tears or breaks in the paper occur, due to the unevenness of the ground, stones and rough handling, this lattice or network will provide means for still retaining the paper so that this will in no way impair the usefulness of the paper.

Where the heavier paper is used for perennials, this lattice or net work will increase the life of the paper, while in use with annuals, such as tomatoes, egg plants and so forth where the lighter weight paper is employed, the life of the paper will be enhanced, and the old plants can be pulled up and new ones re-planted in the old openings. Also where a longitudinal space is left between the strips of paper for planting various rows of plants, such as beans, peas, etc., the marginal wires of the lattice or network will reenforce the edges of the paper, and permit a longer use thereof.

In the accompanying drawings:—

Figure 1 is a plan view of a portion of a strip of paper mulch with the lattice in use therewith.

Figure 2 is a section on line 2—2 thereof.

Figure 3 is a section on line 3—3 of Figure 1.

Figure 4 is a plan view of a modified form of lattice or net work.

Figure 5 is a sectional view through the earth and part of the mulch paper and lattice adjacent the peg attachment.

Referring to the drawings, the numeral 5 designates the strip of mulch paper, which as here shown is provided with a plurality of longitudinally disposed slits or cuts 6 and a short cross slit or cut 7 at each end thereof, to provide the two lateral wings or flaps 8, to be folded in or out when planting either the transplanted plants, such as tomatoes, egg plants, peppers, etc., or the planting of the seeds. These slits in a narrow paper may be in the center, or in a wide paper may be in staggered rows, as may be found most desirable.

The wire lattice 9, is composed of the two longitudinal strands or marginal wires 10, which are adjacent to but slightly within the margin of the edges of the paper strip, but they may be placed slightly exteriorly of the edges of the paper strip. These wires are connected by the light cross wires 11 and 12. These cross wires are attached to the marginal wires in any desired manner by twisting or electrical welding and too are adapted to lie on the upper surface of the mulch paper when the paper is placed upon the ground. At stated intervals throughout the length of the strip of paper and lattice or network, pegs or pins 13 are driven in the ground, and to these, the marginal wires 10 are stapled as at 14. Thus by this means the wire lattice or network rests upon the paper and provides an open retaining means to hold the paper flat upon the ground and in such a manner as to reduce the liability of wind getting under and moving or destroying the paper, as is the case unless some anchoring means is provided.

The use of wickets made of wire to pin the paper down is now used, but this does not provide the necessary longitudinal and marginal fastenings and the cross retainers as in the present case, and as this paper easily tears when first unrolled, it is a decided advantage to have the lattice or network rolled with the paper, so that by unrolling the paper with the paper face down, the wire automatically falls on top and holds the paper temporarily, until the marginal wires can be stapled. This lattice also provides a means whereby after the paper and lattice has been unrolled upon the ground, the lattice or network independently of the paper can be pulled upon to stretch the same over the paper and thus insure a closer contact of the paper with the ground which is most essential.

Where so desired the lattice or network can be rolled separately and then spread over the paper by unrolling, but it is more practical that the lattice or network be originally rolled with the paper so that the user can purchase the paper and network already for use.

What is claimed, is:—

1. A retaining means for a strip of mulch paper and adapted to be placed on top of the flat laid paper, said means having parallel and longitudinal members connected by cross members.

2. A retaining means for a strip of mulch paper and adapted to be placed on top of the flat laid paper, said means comprising longitudinal and parallel flexible non-stretchable members connected together by cross members.

3. A retaining means as claimed in claim 1, in which the two members are made from strands of wire.

4. The combination with a rectangular strip of mulch paper, of a wire retainer therefor provided with parallel marginal members and cross members for resting upon the upper surface of the paper when said paper is laid upon the soil.

5. A roll of combined mulch paper and metal retainer formed in overlaid convolutions, the paper constituting the outer convolution, whereby as the roll is unwound the paper lies on the bottom and the retainer on top of the paper.

6. As an article of manufacture, a strip of rectangular mulch paper and a network of metal wires coextensive with the paper, said network of metal wires consisting of two parallel attaching marginal members and spaced cross members connecting the marginal members together.

7. An article of manufacture as claimed in claim 6, in which the paper and network are formed into a roll with the paper forming the external convolution.

8. The combination with two rows of pegs driven in the ground and a rectangular strip of mulch paper resting upon the ground between the rows of pegs, of a metallic lattice retainer for the paper resting upon the upper surface of the paper, and means for attaching the margins of the lattice to the pegs.

9. The combination with a plurality of pegs driven in the ground and formed into two rows, and a strip of mulch paper resting upon the ground between the rows of pegs, of a metal lattice retainer for the paper resting upon the top surface of the paper, and means for attaching the margins of the lattice to the pegs.

10. The combination with a plurality of pegs driven in the ground and formed into two rows, and a strip of mulch paper resting upon the ground between the rows of pegs, of a network of wire strands resting upon the paper, said network including two marginal members composed of heavier strands than the remainder, and means for attaching the marginal members to the pegs.

11. Means for retaining rectangular strips of mulch paper in place upon the ground, comprising two parallel and spaced wires forming the outer margins and also for receiving staples to hold the means in place, and cross wires connected to and connecting said parallel wires to limit the distance therebetween and to rest upon the paper and with the parallel wires hold the paper in a relatively flat and snug position.

In testimony whereof I affix my signature.

DAVID PELTON MOORE.